April 16, 1935. A. C. G. PETERSEN 1,997,976
FILM HAVING A PHOTOGRAPHIC SOUND RECORD FOR PREPARING SAME
Filed Nov. 10, 1932
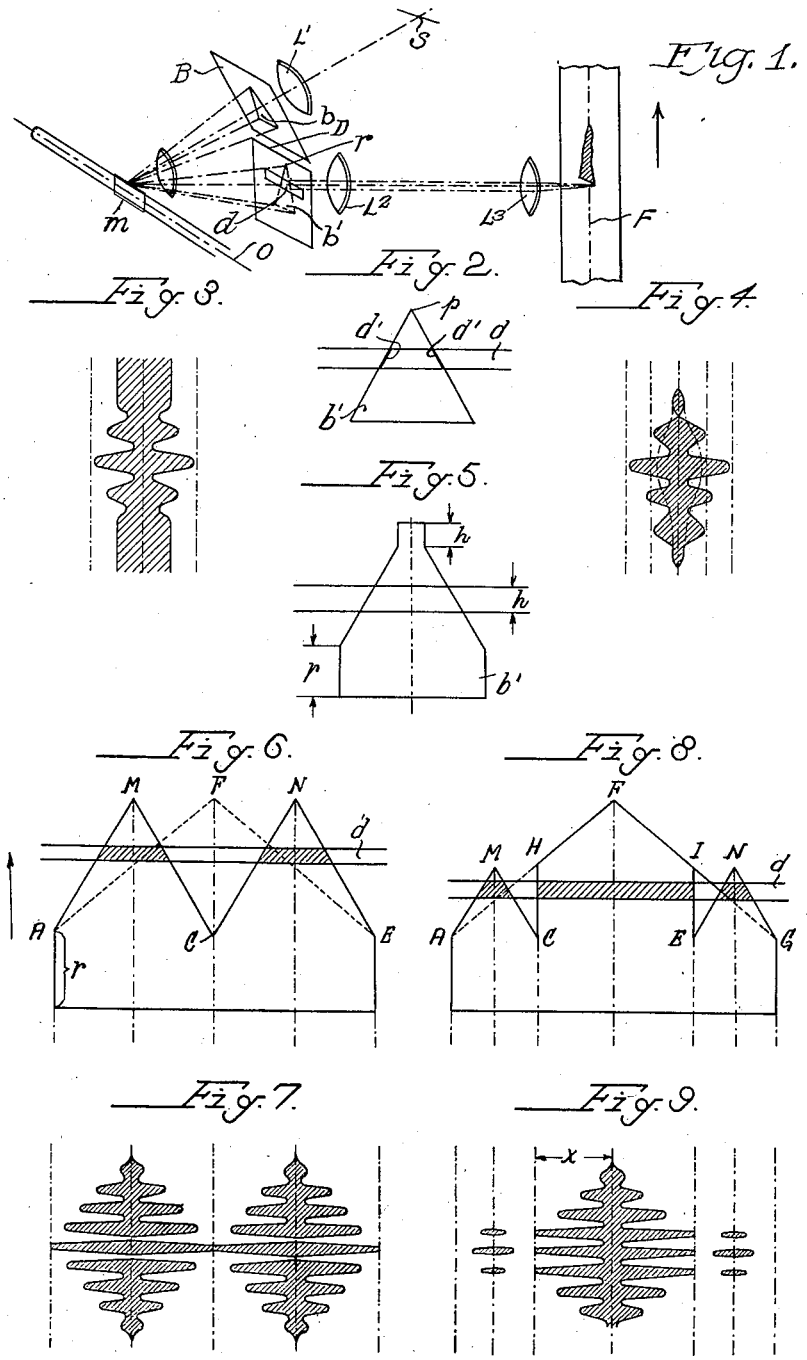
Inventor:
Axel Carl Georg Petersen Patented Apr. 16, 1935

1,997,976

UNITED STATES PATENT OFFICE 1,997,976

FILM HAVING A PHOTOGRAPHIC SOUND RECORD FOR PREPARING SAME

Axel Carl Georg Petersen, Copenhagen, Denmark, assignor of part interest to Arnold Poulsen, Charlottenlund, near Copenhagen, Denmark Application November 10, 1932, Serial No. 642,117
In Norway September 26, 1932

20 Claims. (Cl. 179—100.3)

The invention relates to photographic sound records and particularly to records of the varying width constant density type, in which the exposed area is bounded by two sinuous lines, each of which represents the trace or outline of an ordinary variable width record, and methods and apparatus of producing such records.

It has previously been proposed to prepare a sound record of the variable width constant density type bounded by two sinuous traces, so-called double-hump records, by directing a beam of light triangular in cross-section against a rectangular slit on to a moving film and to cause the beam of light to oscillate in the direction of motion on the film in accordance with the form of the sound waves across the said slit, which is arranged transversely of the film. In this manner a record is prepared, the exposed area of which is bounded by two traces, each of which is symmetrical about a separate axis parallel to the direction of the motion of the film.

The mean width of the exposed area of this type of film is constant, that is to say, the mean width of exposure is equal to the distance between the axes of the two traces. Consequently, the mean width of the translucent area of the corresponding position film is also constant and therefore the background noise which accompanies the reproduction and originates from irregularities in the transparency and the structure of the photographic layer of the film, is mainly of a constant amplitude, irrespective of whether the intensity of the sound is great or small. In consequence the background noise is relatively more noticeable when sounds of small intensity are reproduced and affects the reproduction of such sounds in a disturbing manner.

It has also been proposed to make double-hump records by projecting a beam of light upon a moving film through a rectangular aperture arranged transversely in front of the film and to vary the length of this aperture by causing two ribbons, which form the two end boundaries of the said slit to vibrate in accordance with the form of the sound waves and simultaneously in accordance with the variations in the intensity of the sounds. The ribbons are moved in a direction parallel to the length of the slit in such a manner that the slit is completely uncovered once during every complete oscillation. The crests of the traces on a record so prepared are in straight lines, so that both traces are within the two straight lines which form the outer boundaries of the sound track. Obviously, the mean width of the exposed area of the original or negative sound track and consequently the mean width of the transparent area of the sound track positive increases when the intensity of the sound decreases. This is objectionable because parasitic noises caused by the irregularities previously referred to are more noticeable the greater the width of the transparent area.

It has been further proposed to prepare a record of the variable width type by directing a beam of light on to a film through an aperture which has the form of a trapezium, and to vary the width of the trapezium in accordance with the form of the sound waves. In preparing a sound record in this manner there is formed on the film an image of the trapezium of considerable width in the direction of motion of the film, the width being varied in accordance with the form of the sound waves. On account of the considerable width of the image the elementary areas of exposure of the film corresponding to the different individual sound waves partly overlap one another. The record will be of a combined variable width and variable density type. The record is not true to either type because the overlapping causes an intermingling of the sounds. The mean width of exposure of sound records of this kind and consequently the mean transparency of the copied records is also constant.

In a modification of the last mentioned method, it has been proposed to use a mirror which is vibrated in accordance with the form of the sound waves and reflects an image of a triangular aperture in the path of the beam of light on to the film. In front of the film is a diaphragm having an angular excision which is overlapped by one angle of the reflected image. The light rays which fall within the area of the image extending outside the angular edge of the diaphragm are incident on the film and form thereon an area of light having the form of a trapezium. The width of the trapezium in the longitudinal direction of the film and consequently also the length of the trapezium transversely of the film is caused to vary in accordance with the form of the sound waves due to the vibrations of the mirror. These vibrations cause the image formed on the diaphragm to vibrate in the direction of motion of the film in accordance with the form of the sound waves. The exposed area of a sound record of this kind is also of constant mean width and consequently the mean width of the transparent area of the copied record is also constant.

The object of the present invention is a sound record of the double-hump type and in which the mean width of the exposed area is varied in accordance with the intensity of the sound in such a manner that the said mean width decreases as the intensity of the sound decreases. In a sound reproducing film copied from such a record the transparent area will have a mean width, which decreases with the intensity of the recorded sounds. Parasitic noise in the reproduced sounds will thus be considerably reduced.

According to the present invention two apertures are employed one of which is rectangular and the other triangular, or partly triangular. The image of one of the apertures, projected on to the other aperture, is caused to oscillate in a direction parallel to the motion of the film in a manner depending upon both the variations in the form of the sound waves and upon the intensity of the sound. The troughs of each of the two traces will be in a straight line or approximately in a straight line, parallel to the axis of the sound track. The mean width of the records is, therefore, reduced as the intensity of the sounds decreases.

In a preferred method of carrying the invention into effect, a beam of light is projected through two apertures in succession, and the remaining light is allowed to fall on to the surface of the film. The first aperture is triangular and the second a narrow rectangular slit. The combined effect upon the beam of light passing through the two apertures is that the area of light incident on the film takes the shape of a trapezium.

Now, if relative movements parallel to the direction of movement of the film are produced between the apertures, or between one of the apertures and the beam of light after it has passed the first aperture, the result of these movements will be to alter proportionally the length of the trapezium of light and consequently the width of the exposed portion of the moving film. The relative movements producing the modulation are made to vary in accordance with the wave form and also in accordance with the intensity of the sounds being recorded. If no sound is to be recorded, the relative positions of the slit and triangular aperture are such that the light beam, after passing the triangular aperture will not fall on the slit, but when sound is to be recorded, the slit is brought within the path of the beam. Relative movements between the apertures, or between one of the apertures and the beam of light after it has passed the first aperture, may be produced in any known manner, either the aperture or the triangular beam or both being controlled by the sound waves to be recorded.

In a modified application of the invention larger amplitudes of the record are divided into two or more sections, each of which has its own centre line located at a constant distance from the edge of the film. This particular method offers the advantage that, although in reproduction a part of the larger amplitudes may be cut off by inaccurate positioning of the apertured mask. a corresponding part will always be present in the remaining portion of the record and will be reproduced. In carrying this modification of the invention into effect, the distance to which the peak points of the sound trace extend on either side of a centre line is limited to a predetermined maximum.

In a further modified application of the invention, the peak points or amplitudes which would otherwise extend beyond the maximum distance just referred to are divided into three record traces, one of which is a continuation of the main record and the other two traces form additional records on either side of the main record, each trace having a centre line which is parallel to the centre line of the main record. The two outer traces thus represent the peak points of the larger amplitudes. In order to produce these results the triangular aperture or the triangular portion of the aperture in the mask is divided into, or replaced by, two or more triangular apertures arranged side by side and having a total area which preferably, though not necessarily, is equal to the area of the first mentioned triangle.

The control circuits which may be used in conjunction with the present invention are disclosed in our copending application Serial No. 563,447, filed September 17, 1931.

In order that the invention may be more clearly understood and readily carried into effect, some methods of applying the invention will now be described by way of example in connection with the accompanying drawing. The drawing illustrates several forms of sound record produced in accordance with the invention, and of the mask or diaphragm provided with the triangular aperture, but the invention is in no way limited to these forms or example, which may be varied in several ways within the scope of the invention.

Referring to the drawing:—

Figure 1 illustrates diagrammatically a sound recording system according to the invention.

Figure 2 illustrates on a large scale, the position of a slit through which the film is illuminated and an image of a triangular aperture in a mask or diaphragm used in the system according to Figure 1.

Figure 3 shows a portion of a sound record prepared by means of the system shown in Figure 1.

Figure 4 shows a portion of a modified sound record prepared by means of the system shown in Figure 1.

Figures 5 and 6 show images of two modified forms of the triangular aperture in the mask or diaphragm shown in Figure 1.

Figure 7 shows a portion of a sound record prepared by means of the system shown in Figure 1, but provided with a mask or diaphragm, having an aperture of the form shown in Figure 6.

Figure 8 shows the image of a further modified form of the triangular aperture in the mask or diaphragm, and Figure 9 shows a portion of a sound record prepared by means of a system as shown in Figure 1, but in which a mask or diaphragm having an aperture as shown in Figure 8 is employed.

Referring to Figure 1, an image of a light source S of any suitable kind and shape is formed on a mirror $m$ by means of a lens $L_1$. Amplified microphonic currents, which correspond to the sounds to be recorded, cause the mirror $m$ to oscillate about a horizontal axis $o$. A diaphragm B having a triangular aperture $b$ is arranged in the path of the light rays behind the lens $L_1$, and a lens $l$, which is arranged in front of the mirror $m$, focusses an image $b'$ of the said triangular aperture $b$ on a screen or mask D, which is located between the lens $l$ and the film F and is provided with a horizontally disposed rectangular slit or aperture $d$. The cross-section of the light beam passing the slit $d$ is thus in the shape of a trapezium and the light beam is by means of lenses $L_2$ and $L_3$ concentrated on the film F to form on it an extremely narrow transversely disposed strip of light.

Assuming that the mirror $m$ is caused to oscillate in conformity with the sound waves to be recorded, the image $b'$ would be caused to describe a reciprocating movement in the plane of the screen D and in a direction parallel to the direction of movement of the film F. This movement causes the length of the portion of the slit $d$, which is illuminated by the said image to vary in accordance with the amplitude of the sound to be recorded and the record thus made on the film would have the appearance shown in Figure 3.

If, in addition to being influenced by the alternating currents representing the sound waves to be recorded, the mirror is also controlled by a rectified component of that current having a value such that the distance between the slit $d$ and the peak point $p$ of the image $b'$ of the triangular aperture $b$ is varied in accordance with the maximum amplitude of the sound waves to be recorded, then the resulting sound record would resemble that shown in Figure 4.

The manner in which a rectified current of the nature mentioned may be obtained is well known, and, therefore, need not be described. If the rectified current, when the volume of the sound is at zero, is adjusted to a value which ensures that the slit $d$ is situated just outside the peak point of the image $b'$ then the film will not be exposed to light when there is no sound and, consequently, on a positive film copied from the original negative record, the sound track will be entirely opaque at portions of the record representing periods of silence.

When sound to be recorded occurs, the rectified current causes the recording device to actuate the mirror $m$ in such a manner that the image $b'$ is moved to a degree relatively to the slit $d$ such that, the peak point is moved beyond the said slit to an extent which ensures that the film is exposed to light during the entire period of time within which the sound continues. Thus, the peak point is moved to an extent which is at least equal to the maximum amplitude of the sound waves. In practice, however, in order to avoid cutting off peaks representing small amplitudes of sound and to prevent variations in noticeable intensity of the exposure, the image $b'$ should preferably be moved a little further in relation to the slit $d$, or alternatively the slit $d$ should be arranged so as to be situated inside the peak point $p$ of the image $b'$ during the periods of silence. In this latter case, during the period of silence the film will be exposed to a constant, although very small width. Thus, in the periods of silence, the sound track will not be perfectly clear across its entire width, but a narrow strip of exposed area of constant width will appear in the central part of the sound track representing the silent periods.

Figure 5 shows an image resulting from a modified form of aperture which may be formed in the mask or diaphragm B. It is evident that relative motion between the slit $d$ and the image $b'$ will cause the peak point $p$, when the sound is weak to move inside the boundaries of the slit $d$. When this occurs, the amount of light passing the slit $d$ will not vary in exact proportion with the motion of the image $b'$ relatively to the slit $d$, but additional disturbing variations in intensity of the light concentrated on the film will occur; in order to avoid this, the apex of the triangular aperture is made rectangular.

The image $b'$ will thus appear as shown in Figure 5, in which the apex of the triangular aperture terminates in a rectangle of height $h$. The height $h$ should preferably be equal to the width of the slit $d$. When the image of the upper edge of the rectangular opening, completing the triangular aperture $b$, moves relatively to the slit $d$ to oscillate inside the boundaries of same, the variations of the width of the record will be replaced by variations in the intensity of the exposure of a band of constant width of the sound track. Very weak sounds will thus be represented by a record of constant width of varying intensity. The lower portion $r$ of the image $b'$ is also rectangular in shape and forms the image of an additional rectangular opening which completes the aperture at the bottom, that is to say, along the base of the triangular aperture which is parallel to the slit $d$. The rectangular portion $r$ serves the purpose of preventing any interruption of the illumination of the film when sounds of very large amplitude appear.

It is, of course, clear that the apparatus may take other forms and may be arranged in other ways than as described. The light source S, for example, may be linear in shape and one of the spherical lenses $L_2$, $L_3$ may be replaced by a cylindrical lens. In such a case the spherical lens will form on the film an image of the boundaries $d'$ of the illuminated portion of the slit $d$, as shown in Figure 2, while the cylindrical lens forms an image of the linear light source on the film. In this manner an extremely narrow strip of light may be concentrated on the film even when the width of the slit $d$ is relatively large.

In a modified method of carrying the invention into effect, the mirror $m$, which is oscillated both in accordance with the form of the sound waves and in accordance with the volume of the sound, is replaced by two separate mirrors which are arranged one behind the other in the path of the light rays. One of the mirrors is actuated exclusively by the microphonic current the wave form of which corresponds to the wave form of the sounds, while the other mirror is actuated by a rectified current which varies in accordance with the volume of the sound. The axes of the two mirrors may be parallel to one another and to the surface of the film. Owing to the fact that the second mirror performs relatively slow motions, the said mirror may be made so large that in practice no loss of light occurs.

According to another modification of the invention the mirror $m$, Figure 1, is moved in accordance with variations in the form of sound waves, whilst the mask B is caused to perform a reciprocating movement in the direction of movement of the film in accordance with variations in volume of the sounds.

In this modified arrangement of recording sounds, the amplified microphonic current is caused to actuate the mirror $m$ and a rectified portion of that current is caused to actuate an electromagnetic device, not shown in the drawing, which moves the screen B, and, consequently, the aperture $b$ in the desired manner.

In the preceding description it has been assumed that the triangular aperture $b$ is to be equilateral in shape. However, it is evident that the advantages obtained according to the present invention would not be lost, if the shape of the aperture $b$ differs from the equilateral or symmetrical shape, provided that the peak point $p$ of the image of the said aperture when projected on the film through the slit $d$, is situated a sufficient distance from both edges of the sound track. On the other hand, it is important that the side edges of the aperture $b$ converge to a point, although, as shown in Figure 5, an aperture truncated as there shown, may be employed, because otherwise it would not be possible by displacement of the light beam in the direction of movement of the film to cut off the light from the film during periods of silence.

It has previously been proposed to use a diaphragm, the side edges of which were other than straight for the purpose of preparing a sound record the amplitude of which does not vary in proportion with the amplitude of the recorded sound. It is evident that the invention may also be carried into effect with the aid of a diaphragm of this kind.

In the reproduction of sounds which are recorded in the manner described above, the masking aperture in the reproducing apparatus should be adjusted to a very exact position in relation to the sound track, as otherwise the peaks on the record representing the larger amplitudes of sound may be masked off.

This undesirable masking off may result in noticeable distortion in the reproduced sounds, and in order to prevent such distortion the triangular aperture b in the diaphragm B may be replaced by, or divided into, two or more triangular or partly triangular apertures which are arranged side by side as illustrated by way of example in Figures 6 and 8. In these figures the apertures, referred to in greater detail below, are represented by the form their image takes on the screen D across the slit d.

The triangular aperture b, Figure 1, is represented in Figure 6 by the triangle AFE. This triangular aperture is replaced by, or divided into, two smaller triangular apertures AMC and CHE respectively, the total area of which is equal to the area of the triangle AFE. In this figure the sides of the triangular aperture finish parallel to each other, the length of the parallel sides being equal to r as previously described in connection with Figure 5. A record prepared by means of the system shown in Figure 1 provided with a diaphragm having an aperture of the form illustrated in Figure 6 would resemble that shown in Figure 7. This record comprises two identical records of the same character as the record shown in Figure 4, disposed next to one another on the film and are each symmetrical about an individual axis which is parallel to the direction of motion of the film. It is evident that in a record of the kind shown in Figure 7 each variation of the sound is represented at four different points, that is to say on either side of both of the said axes of each individual record. The record shown in Figure 7 offers the advantage that, even if a part of a larger amplitude is cut off due to an inaccurate position of the masking aperture in the reproducing apparatus, a corresponding part is always subject to the reproducing light beam, namely, in the area of the record situated between the two separate axes.

Figure 8 shows a modified form of the triangular aperture. As shown in this figure, the said aperture is divided into, or replaced by, three smaller apertures which are arranged side by side and comprise two smaller triangular apertures AMC and ENG respectively and a third aperture CHFIE, which is located between the two triangular apertures and has the shape of an irregular pentagon. The total area of the three apertures is equal to the area of the triangular aperture b which is indicated in Figure 8 partly by dotted lines and is represented by the triangle AFG in this figure.

A record prepared with the aid of a diaphragm having an aperture of the shape shown in Figure 8 is shown in Figure 9. This record comprises a middle main record which corresponds substantially to the record shown in Figure 4, and two additional records which are arranged one on each side of the main record. The three records are each symmetrical about separate centre lines or axes all of which are parallel to the direction of motion of the film. The larger amplitudes represented in the record are recorded in two or more places, that is to say, in the main record and on either side of the main record as shown in Figure 9, but amplitudes represented by a length smaller than X shown in Figure 9, and corresponding to half the width of the rectangular portion of the intermediate aperture CHFIE in Figure 8, would appear only in the main record. The effect of masking off peak points by the edges of the aperture in the reproducing apparatus will thus be considerably reduced.

Having now particularly described and ascertained the nature of my said invention and in what manner the same is to be performed I declare that what I claim is:—

1. In an apparatus for producing on a moving film a photographic sound record of the varying width constant density type, a source of light for producing a light beam impinging on the film, a stationary screen disposed in the path of said light beam and having a rectangular narrow aperture transverse to the direction of movement of the film, a second screen provided with an aperture, two side edges of which converge in said direction, and arranged in the path of said light beam in such position relatively to the first mentioned screen that by means of the said light beam there is formed on one of said screens across the aperture therein an image of the aperture in the other of said screens, and means for relatively vibrating the said image and the last mentioned aperture in the direction of movement of the film depending both on the variation of the form of the sound waves and also on the variation of the intensity of the sound.

2. In a apparatus for producing on a moving film a photographic sound record of the varying width constant density type, a source of light, a mask arranged in the path of light beam from said light source, impinging on the film, and provided with an aperture having two sides making an angle with the length of the film, a second mask disposed in the path of said light beam and therein a narrow stationary rectangular aperture transverse to the length of the film, means for forming an image of one of said apertures on the mark provided with the other aperture and means for causing relative vibration between the said image and the last mentioned mask in the direction of movement of the film depending upon both the variation in the form of the sound waves and on the intensity of the sound.

3. In an apparatus for producing on a moving film a photographic sound record of the varying width constant density type, a source of light for producing a light beam impinging on the film, a stationary screen disposed in the path of said light beam in front of the film and having a rectangular narrow aperture transverse to the length of the film, a mask having an aperture two side edges of which converge in the direction of movement of the film, means for forming on said screen an image of the last mentioned aperture, and means for vibrating the said image in the direction of movement of the film relatively to the rectangular slit depending on the variation of the form of the sound waves and also on the variation of the intensity of the sound.

4. In an apparatus for producing on a moving film a photographic sound record of the varying width constant density type, a source of light for producing a light beam impinging on the film, a mask, a mirror and a screen disposed in the path of said light beam in the order named, said mask having an aperture, two side edges of which converge in the direction of movement of the film, said screen having a narrow rectangular slit transverse to the film, means for forming an image of said aperture on said screen across the rectangular slit therein, and means for vibrating said mirror in the direction of movement of the film and relatively to said slit depending on the variations of the form of the sound waves and also on the intensity of the sound.

5. Apparatus according to claim 4, and in which means are provided for rectifying a portion of the alternating currents representing sounds to be recorded, and means controlled by the rectified current for modifying the relative oscillations of the image of the aperture relatively to the slit in the direction of movement of the film depending on the variation in the intensity of the sounds, the modifications caused by said rectified current varying in inverse proportion with the intensity of the sounds to be recorded.

6. Apparatus according to claim 4, in which the mask has several apertures arranged side by side, each aperture having two side edges converging in the direction of movement of the film, the central aperture being of a different size and greater height than the other apertures.

7. In an apparatus for producing on a moving film a photographic sound record of the varying width constant density type, a source of light, a mask having an aperture having two sides making an angle with the horizontal in the path of the light beam, a screen having a narrow rectangular horizontal slit in the path of the light beam and transverse to the film, means for relatively vibrating the light beam and the mask in the direction of movement of the film and relatively to said slit depending on both the variations in the form of the sound waves and the intensity of the sound.

8. In an apparatus for producing on a moving film a photographic sound record of the varying width constant density type, a source of light, in the path of said light beam a mask, a mirror and a screen, in the order named, said mask having an aperture two sides of which are sloping and make an angle with the horizontal and said screen having a horizontal narrow rectangular slit transverse to the film, and means for vibrating said mirror in the direction of movement of the film and relatively to said slit depending on both the variations in the form of the sound waves and the intensity of the sound.

9. Apparatus according to claim 4 and in which an optical system forms on the screen a reflected image of said aperture with its two sides intersecting the longer sides of the slit at small angles.

10. Apparatus according to claim 4 and in which means are provided for rectifying a portion of the alternating currents representing the sounds to be recorded, and means controlled by the rectified current for modifying the relative oscillations of the beam and mask in the direction of movement of the film dependent on the variations in the intensity of the sounds, the modification caused by said rectified current varying in inverse proportion with the intensity of the sounds to be recorded.

11. A photographic sound record of the varying width constant density type having two separate traces representing the same sounds and located on the two sides of a longitudinal axis, and in which the positive record has a transparent sound track along its axis which is bounded by said two traces, the transparent sound track having a mean width which decreases as the amplitude of the sound decreases.

12. A sound record according to claim 11 and in which the troughs of the traces are located substantially parallel to the edges of the film near the axis of the sound track.

13. A photographic sound record of the varying width constant density type according to claim 11 on which sound, the intensity of which is less than a predetermined value, is recorded by variations in density of a track of a constant minimum width bounded by parallel portions of the two traces.

14. A photographic sound record of the varying width type according to claim 5 in which the portions of the record representing amplitudes which exceed a predetermined maximum value are recorded separately on a side of the record and reperesnt the remaining portion of the said amplitudes and consists of one or more traces each located on a side of a longitudinal axis separate from and parallel to the axis of the main record in such a manner that the amplitudes of the said traces extend from the said longitudinal axis.

15. A photographic sound record of the varying width constant density type having several parallel tracks, the mean width of which varies in accordance with the volume of the sound and on which at portions representing the smallest amplitudes less tracks are provided than at the higher amplitudes.

16. A photographic sound record according to claim 15, on which only a single sound track is provided at smaller amplitudes.

17. Apparatus according to claim 7, in which the mask has several apertures arranged side by side and having each two sides making an angle with the horizontal, the central aperture being of a different size and a greater height than the other apertures.

18. Apparatus according to claim 7, in which the mask is provided with a plurality of triangular apertures arranged side by side on the same base line, the central aperture having a greater height than the other apertures.

19. Apparatus according to claim 7 in which means are provided for rectifying a portion of the alternating current representing the sounds to be recorded, and means controlled by the rectified current for modifying the relative oscillations of the light beam and mask in the direction of movement of the film depending on the variations in the intensity of the sounds to be recorded.

20. Apparatus according to claim 7 in which means are provided for rectifying a portion of the alternating current representing the sounds to be recorded, and means controlled by the rectified current for modifying the relative oscillations of the light beam and mask in the direction of the movement of the film in the inverse proportion of the intensity of the sounds to be recorded.

AXEL CARL GEORG PETERSEN.

DISCLAIMER 1,997,976.—*Axel Carl Georg Petersen*, Copenhagen, Denmark. FILM HAVING A PHOTOGRAPHIC SOUND RECORD FOR PREPARING SAME. Patent dated April 16, 1935. Disclaimer filed December 27, 1937, by the patentee.

Hereby enters this disclaimer to claims 1, 2, 3, 4, 5, 7, 8, 9, 10, 19, and 20 of said specification.

[*Official Gazette February 1, 1938.*]